Nov. 18, 1930.  G. ANCIRA  1,782,114
SUN DIAL
Filed Nov. 22, 1927
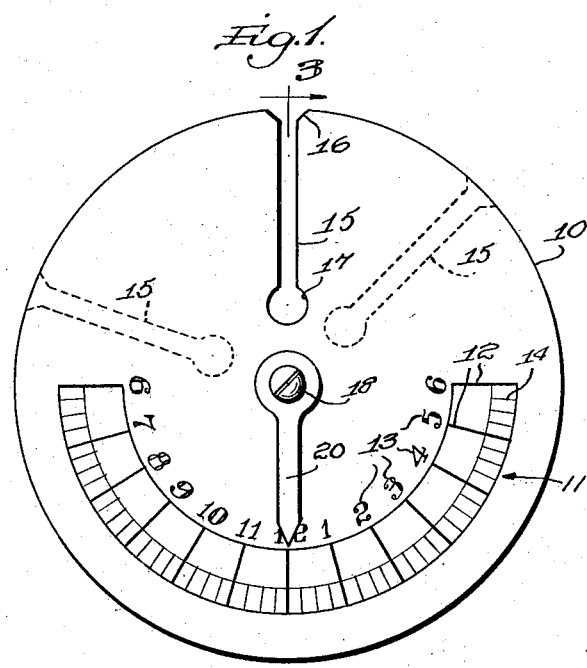
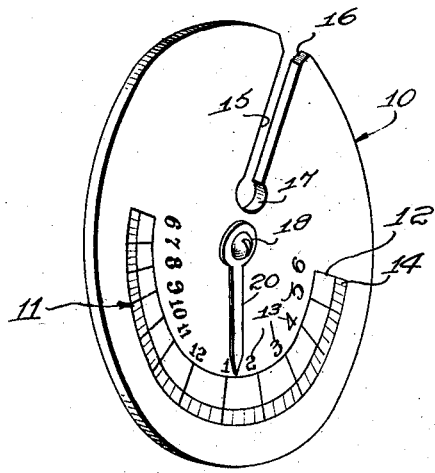
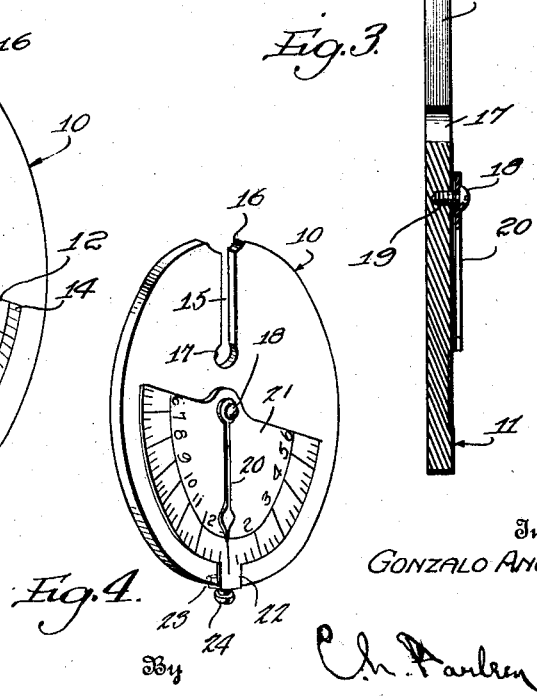
Inventor
GONZALO ANCIRA Patented Nov. 18, 1930

1,782,114

UNITED STATES PATENT OFFICE

GONZALO ANCIRA, OF HOUSTON, TEXAS

SUNDIAL

Application filed November 22, 1927. Serial No. 235,096.

This invention relates to sun dials.

An important object of the invention is to provide a small novel form of sun dial adapted to be carried in the pocket of the user.

A further object is to provide such a device having a portion adapted to indicate the time of day and a relatively movable portion adapted to be alined with the sun to cause the first named portion to indicate the time.

A further object is to provide a body including a dial and having a portion preferably in the form of a radial slot adapted to be alined with the sun, and a pointer pivoted centrally of the body and adapted to swing over the dial to indicate the time.

A further object is to provide a device of the character referred to which may be corrected to compensate for the differences between standard and daylight saving time and meridian time.

Other objects and advantages of the invention will become apparent during the course of the following description.

In the drawings I have shown several embodiments of the invention. In this showing, Figure 1 is a face view, Figure 2 is a perspective view, Figure 3 is a section on line 3—3 of Figure 1, and, Figure 4 is a perspective view of a modified form of the device.

Referring to the drawings, the numeral 10 designates the body of the device which is preferably thin and circular in form. It is preferred that the body be made relatively small so that it may be carried in the pocket of the user. The body forms a dial and is provided on one face with a scale 11 arranged concentric with the body and provided with division lines 12 indicating the hours of the day. Suitable indicia 13 are arranged adjacent each of the hour lines. The spaces between the lines 12 may be calibrated as at 14 to indicate the quarter hours. The device of course, is adapted for use during the daylight hours, and the indicia 13 preferably are employed to indicate the hours between 6 a. m. and 6 p. m. as clearly shown in Figures 1 and 2.

The body of the device is movable to arrange it in proper position according to the time of day. To permit the dial properly to be positioned, one edge thereof is provided with a radial slot 15 preferably having its walls diverging outwardly at their outer ends at 16. The inner end of the slot 15 preferably terminates in a circular opening 17.

A screw 18 is threaded in a central opening 19 formed in the body of the device and is adapted to pivotally support a pointer 20. It will be apparent that since the scale 11 is concentric to the body of the device, the pointer 20 is adapted to swing therearound to indicate the hours of the day.

In Figure 4 of the drawing I have illustrated a slightly modified form of the device which is adapted to compensate for the variations in standard and daylight saving time, and meridian time. As is well known, there is usually a difference of one hour between standard and daylight saving time, and each standard time zone varies in different portions thereof from the true meridian time. To compensate for these differences, the device may be provided with a dial 21 formed separate from the body of the device and adapted to pivot about the pin 18. The dial 21 may be provided at its lower edge with an extension 22 having a laterally extending portion 23 arranged adjacent the edge of the body. A set screw 24 passes through the lateral projection and engages the edge of the body 10.

The operation of the device is as follows:

The body 10 is held in the hand of the user and is turned until the slot 15 is in alinement with the sun and the rays thereof illuminate the bottom of the circular opening 17. It will be apparent that in using the device the operator should face south with the dial facing toward him, that is, toward the north. With the slot 15 turned to the position indicated, the pointer 20 will indicate the time of day. For instance, if the dial is rotated until the slot 15 occupies the dotted line position shown at the left side of Figure 1, the finger 20 would indicate the time as being about 8 o'clock in the morning. Similarly with the slot 15 in the other dotted line position, the pointer 20 will indicate the time as being approximately 3 o'clock in the afternoon. It will be apparent that the device is extremely simple and is attractive as a novelty, and it readily may be carried in the pocket of the user.

The operation of the form of the device shown in Figure 4 is the same as that previously described. It will be apparent, however, that the dial and the slot are adapted to be moved relative to each other to compensate for differences between meridian time, and standard and daylight saving time. For instance, with the parts in the position shown in Figure 4, the device may be corrected for daylight saving time by loosening the screw 24 and rotating the dial 21 until the numeral "2" registers with the point of the indicator. Similar corrections may be made for different parts of a given standard time zone.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A device of the character described comprising a disk, and a pointer pivotally connected to said disk, said disk being provided with an arcuate scale concentric with the pivot point of said pointer, said disk being further provided with a slot extending radially of the pivot of the pointer and adapted to be alined with the sun.

2. A device of the character described comprising a disk, a pointer pivotally connected at one end to said disk centrally thereof, said disk being provided over one semi-circle with an arcuate scale concentric with the pivot of said pointer, the opposite semi-circle of said disk being provided with a straight radial slot adapted to be alined with the sun.

3. A device of the character described comprising a disk, means bearing a scale pivotally connected to said disk, means for securing said scale against movement with respect to said disk, and a pointer pivotally connected adjacent said scale concentric with the pivot thereof, said disk being provided with a slot extending radially of the pivot point of scale and pointer and adapted to be alined with the sun.

In testimony whereof I affix my signature.

GONZALO ANCIRA.